United States Patent
Kochura

(10) Patent No.: US 10,621,222 B2
(45) Date of Patent: *Apr. 14, 2020

(54) FUZZY TERM PARTITION IDENTIFICATION

(71) Applicant: INTERNATIONAL BUSINESS MACHINES CORPORATION, Armonk, NY (US)

(72) Inventor: Nadiya Kochura, Bolton, MA (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 16/516,438

(22) Filed: Jul. 19, 2019

(65) Prior Publication Data

US 2019/0340191 A1    Nov. 7, 2019

Related U.S. Application Data

(63) Continuation of application No. 16/117,411, filed on Aug. 30, 2018, now Pat. No. 10,394,876, which is a (Continued)

(51) Int. Cl.
*G06F 16/36* (2019.01)
*G06N 7/02* (2006.01)
(Continued)

(52) U.S. Cl.
CPC .......... *G06F 16/367* (2019.01); *G06F 17/27* (2013.01); *G06F 17/271* (2013.01); (Continued)

(58) Field of Classification Search
CPC ...... G06F 16/36; G06F 16/367; G06F 16/374; G06F 17/27; G06F 17/2785; G06F 17/271; G06F 17/2755; G06N 7/023
See application file for complete search history.

(56) References Cited

U.S. PATENT DOCUMENTS 5,957,520 A * 9/1999 Suda ................. G06N 5/04
706/54
7,117,432 B1 * 10/2006 Shanahan ........... G06F 17/218
715/210
(Continued)

OTHER PUBLICATIONS

Alexopoulos et al., "Towards Ontology-Based Question Answering in Vague Domains," 9th International Workshop on Semantic and Social Media Adaptation and Personalization, 2014, p. 26-31, IEEE Computer Society.
(Continued)

*Primary Examiner* — Eric Yen
(74) *Attorney, Agent, or Firm* — L. Jeffrey Kelly

(57) ABSTRACT

A method, computer system, and a computer program product for building and applying fuzzy term partitions is provided. The present invention may include building a fuzzy category taxonomy. The present invention may also include implementing the built fuzzy category taxonomy into a fuzzy category classifier. The present invention may then include building a fuzzy term extractor. The present invention may further include building a fuzzy term association map. The present invention may also include processing a plurality of words stored on a database. The present invention may then include extracting a fuzzy term from the processed plurality of words. The present invention may further include associating the extracted fuzzy term with a plurality of context data. The present invention may also include producing a context data partition for the extracted fuzzy term. The present invention may then include applying a weight to the extracted fuzzy term.

20 Claims, 7 Drawing Sheets

Related U.S. Application Data continuation of application No. 15/827,161, filed on Nov. 30, 2017, now Pat. No. 10,083,231.

(51) Int. Cl.
*G06F 17/27* (2006.01)
*G06N 5/02* (2006.01)
*G06N 5/04* (2006.01)

(52) U.S. Cl.
CPC ...... *G06F 17/2755* (2013.01); *G06F 17/2785* (2013.01); *G06N 5/022* (2013.01); *G06N 5/048* (2013.01); *G06N 7/023* (2013.01)

(56) References Cited

U.S. PATENT DOCUMENTS

| | | | |
|---|---|---|---|
| 7,958,107 B2 | 6/2011 | Curtis | |
| 8,051,088 B1* | 11/2011 | Tibbetts | G06F 17/2785 707/749 |
| 9,672,827 B1* | 6/2017 | Jheeta | G10L 15/32 |
| 9,946,924 B2* | 4/2018 | Sengupta | G06F 16/35 |
| 10,083,231 B1 | 9/2018 | Kochura | |
| 2003/0216919 A1* | 11/2003 | Roushar | G06F 17/277 704/260 |
| 2006/0048055 A1* | 3/2006 | Wu | G06F 17/273 715/262 |
| 2007/0016571 A1* | 1/2007 | Assadian | G06F 16/3346 |
| 2009/0259647 A1* | 10/2009 | Curtis | G06F 16/9535 |
| 2010/0114879 A1* | 5/2010 | Zhong | G06F 17/278 707/723 |
| 2010/0185689 A1* | 7/2010 | Hu | G06F 17/2775 707/803 |
| 2012/0150852 A1* | 6/2012 | Sheedy | G06F 16/254 707/728 |
| 2012/0254099 A1* | 10/2012 | Flinn | G06F 17/27 706/52 |
| 2012/0290518 A1* | 11/2012 | Flinn | G06N 5/048 706/12 |
| 2012/0331063 A1 | 12/2012 | Rajaram | |
| 2013/0144605 A1* | 6/2013 | Brager | G06F 16/30 704/9 |
| 2015/0286627 A1* | 10/2015 | Chang | G06F 17/2705 704/9 |
| 2015/0363485 A1 | 12/2015 | Bennett | |
| 2016/0226984 A1 | 8/2016 | Kelly | |
| 2016/0358086 A1* | 12/2016 | Sundram | H04L 67/22 |
| 2016/0364608 A1* | 12/2016 | Sengupta | G06F 16/35 |
| 2019/0163819 A1 | 5/2019 | Kochura | |

OTHER PUBLICATIONS

Bakhshandeh et al., "From Adjective Glosses to Attribute Concepts: Learning Different Aspects That an Adjective Can Describe," Proceedings of the 11th International Conference on Computational Semantics, Apr. 15-17, 2015, p. 23-33, Association for Computational Linguistics, London, UK.

De Marneffe et al., "Was it good? It was provocative. Learning the meaning of scalar adjectives," Proceedings of the 48th Annual Meeting of the Association for Computational Linguistics, Jul. 11-16, 2010, p. 167-176, Association or Computational Linguistics, Uppsala, Sweden.

Formica, Anna, "Semantic Web search based on rough sets and Fuzzy Formal Concept Analysis," Knowledge-Based Systems 26 (2012) 40-47.

Gajendragadkar et al., "Context Sensitive Search String Composition Algorithm using User Intention to Handle Ambiguous Keywords," International Journal of Electrical and Computer Engineering (IJECE), Feb. 2017, p. 432-450, vol. 7, No. 1, Institute of Advanced Engineering and Science.

Lakoff, George, "Hedges: A Study in Meaning Criteria and the Logic of Fuzzy Concepts," Journal of Philosophical Logic 2 (1973) 458-508.

Mell et al., "The NIST Definition of Cloud Computing," National Institute of Standards and Technology, Sep. 2011, p. 1-3, Special Publication 800-145.

Peng et al., "Generate Adjective Sentiment Dictionary for Social Media Sentiment Analysis Using Constrained Vonnegative Matrix Factorization," Proceedings of the Fifth International AAAI Conference on Weblogs and Social Media, Association for the Advancement of Artificial Intelligence (www.aaai.org), 2011, pp. 273-280.

Shivade et al., "Identification, Characterization, and Grounding of Gradable Terms in Clinical Text," Proceedings of the 15th Workshop on Biomedical Natural Language Processing, Aug. 12, 2016, p. 17-26, Association for computational Linguistics, Berlin, Germany.

Zadeh, "The Concept of a Linguistic Variable and its Application to Approximate Reasoning—I," Information Sciences, 1975, p. 199-249, vol. 8, Issue 3, American Elsevier Publishing Company.

IBM: List of IBM Patents or Patent Applications Treated as Related (Appendix P), Jul. 26, 2019, 2 pages.

\* cited by examiner

212

FUZZY TERM PARTITION IDENTIFICATION

BACKGROUND

The present invention relates generally to the field of computing, and more particularly to linguistic variables. Linguistic variables may be used in conjunction with a cognitive system based on fuzzy rules. Linguistic variables may also be known as fuzzy terms. People use fuzzy terms in everyday conversations and fuzzy terms may be defined differently depending on various factors. The ability to identify a fuzzy term and the corresponding fuzzy term meaning into a crisp value may provide feedback for a person communicating using fuzzy terms.

SUMMARY

Embodiments of the present invention disclose a method, computer system, and a computer program product for building and applying fuzzy term partitions. The present invention may include receiving a fuzzy term input. The present invention may also include building a fuzzy category taxonomy based on the received input. The present invention may then include implementing the built fuzzy category taxonomy into a fuzzy category classifier. The present invention may further include building a fuzzy term extractor based on the implemented fuzzy category classifier. The present invention may also include building a fuzzy term association map based on the built fuzzy term extractor. The present invention may then include processing a plurality of words stored on a database. The present invention may further include extracting a fuzzy term from the processed plurality of words. The present invention may also include associating the extracted fuzzy term with a plurality of context data. The present invention may then include producing a context data partition for the extracted fuzzy term based on the associated plurality of context data. The present invention may further include applying a weight to the extracted fuzzy term.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
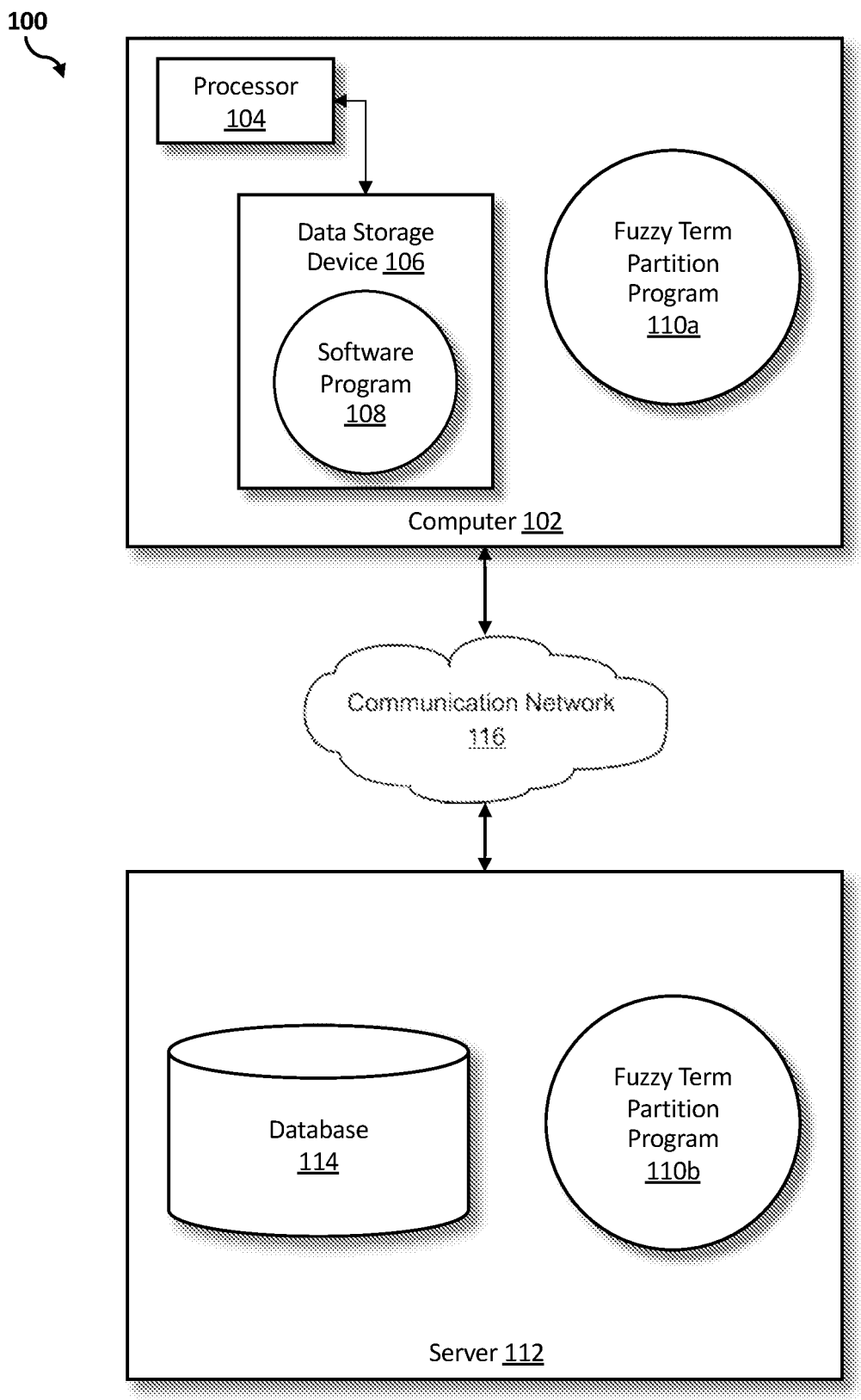
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language, python programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for building and applying fuzzy term partitions to fuzzy terms widely used in conversations. As such, the present embodiment has the capacity to improve the technical field of cognitive computing by detecting and extracting fuzzy terms from everyday conversations. More specifically, machine learning may be used to build and implement a fuzzy term partition program by associating fuzzy terms in a relevant context for a user to have the ability to ask a computing device, either verbally or by typing, a question using fuzzy terms and to be able to receive a response relevant to the user.

As previously described, linguistic variables may be used in conjunction with a cognitive system based on fuzzy rules. Linguistic variables may also be known as fuzzy terms. People use fuzzy terms in everyday conversations and fuzzy terms may be defined differently depending on various factors. The ability to identify a fuzzy term and the corresponding fuzzy term meaning into a crisp value may provide feedback for a person communicating using fuzzy terms.

A fuzzy term used in conversation may, for example, include terms such as hot weather, slow traffic, low cost, early morning or a tall person. The fuzzy terms in the preceding example are hot, slow, low, early and tall. Fuzzy terms are used and widely accepted in society. Fuzzy terms, however, may differ depending on factors (i.e., contexts) of the conversation such as location, region, culture, demographic, personal preferences, group preferences or age of the individuals in communication. Since fuzzy term values may be dependent based on context, mapping a fuzzy term to a crisp value may provide different crisp value results. A crisp value may be a specific value associated with the context of an individual. For example, an individual who lives in a northern region may use the fuzzy term, cold weather, where cold relates to a category of weather, and the crisp value associated with the northern region individual may be a range of −10° Celsius (C.) to −5° C. Alternatively, an individual who lives in a southern region may use the same fuzzy term, cold weather, and the crisp value associated with the southern region individual may be 10° C. to 15° C.

Mapping fuzzy terms used in a verbal utterance (e.g., in a sentence, in a conversation) or a type written utterance (e.g., text message, email message or a social media post) may provide different crisp values depending on the context of an individual or the context of the individual's utterance. Therefore, it may be advantageous to, among other things, provide a method for detecting and extracting fuzzy terms from conversations to identify fuzzy term values and associate the identified fuzzy terms with various usage contexts.

According to at least one embodiment, a fuzzy term partition program may identify a fuzzy term from a conversation (e.g., a social media conversation or a verbal conversation) and correlate the fuzzy term to a fuzzy category (i.e., category) to be associated with a fuzzy partition (i.e., partition or fuzzy term partition). A partition may include a category, a fuzzy term, an attribute, context data and crisp values. Categories may include, for example, the weather, a product, a route description, the time of day, traffic or a description of a person. Fuzzy terms may include, for example, hot, warm, cold, cheap, expensive, close, far, early, late, rush-hour, congested, traffic jam, bumper to bumper, tall, short or young. Attributes may include, for example, temperature, pricing, distance, feet, miles, meters, density, height or age. Context data may include, for example, location, region, state, city, culture, demographic, personal preferences, group preferences or age of the individuals in communication. Crisp values may be exact values associated with the fuzzy terms as the fuzzy terms relate to the category, attribute and context data, such as a price range, a temperature range, a range in distance, or an age range.

The fuzzy term partition may relate to the crisp value of a fuzzy term and the crisp value may be dependent on the category, the attribute and the context of the fuzzy term. For example, a crisp value may include range of temperature degrees when conversing about the weather for a particular region or a range of prices when conversing about a product sold in a particular location. The context of a fuzzy term may also be considered a category. Each fuzzy term may have an associated crisp value range based on various contexts (e.g., location, region, culture, demographic, personal preferences, group preferences or age). Each fuzzy term, therefore, may have multiple fuzzy partitions (i.e., crisp values) for each context.

A fuzzy term partition program may build partitions for different categories and then may apply the built partitions, for example, when executing the program for a user. Building partitions may begin by extracting and using stored conversation data from a particular database for a particular corpus. Building partitions may also begin by receiving, processing and identifying fuzzy terms in conversations and utterances from individuals who may be speaking into a device (e.g., a smart phone, a smart watch, a tablet or a computing device with a microphone). Conversations and utterances may also come from an individual posting typewritten messages (e.g., text message, email message or a social media post). Natural language processing (NLP) may be used to identify a fuzzy term and to identify the category of a fuzzy term. For example, social media analytics may be used in conjunction with NLP to identify fuzzy terms and to categorize fuzzy terms.

From a conversation or an utterance, crisp values may be extracted from the identified and processed fuzzy terms to associate each fuzzy term with a crisp value of relevant context data. For example, the fuzzy term cold is categorized as weather and the real temperature for the particular region of the person in the conversation may be represented by the crisp value (e.g., temperature range considered to be cold for a person living in the particular region). The fuzzy term partition program may then produce updates relevant to the context fuzzy partitions. Different weights may be applied to the extracted fuzzy term values based on, for example, the individual's expertise level with regard to the referenced fuzzy term. An expertise level may, for example, be associated with an expert in a related field, such as a subject matter expert (SME) or may be a person who has lived in a particular region for an extended period of time.

The produced fuzzy partitions may be used by an information retrieval system for mapping fuzzy terms to crisp values. The produced fuzzy partitions may also be used in a recommendation or expert system for providing more accurate and relevant recommendations to a user. The produced fuzzy partitions may further be used in an expert system that may be based on fuzzy logic rules. One system or service that the fuzzy term partition program may communicate with may include IBM Watson® Natural Language Classifier (IBM Watson Natural Language Classifier and all IBM Watson Natural Language Classifier-based trademarks and logos are trademarks or registered trademarks of International Business Machines Corporation and/or its affiliates). One other system or service the fuzzy term partition program may communicate with may include IBM Watson® Conversation Services (IBM Watson Conversation Services and all IBM Watson Conversation Services-based trademarks and logos are trademarks or registered trademarks of International Business Machines Corporation and/or its affiliates).

Fuzzy term partitions, for example, may be identified from social media conversations and thereafter, the conversations may be mapped to the context of usage for a fuzzy term. The fuzzy term partition program may then build a measure to identify the term for the particular context of usage and identify the value (e.g., crisp value) that may be deduced by the content of the conversation. For example, in a conversation when a person is discussing the weather, the fuzzy term partition program may obtain the real value for the weather at the time of the conversation by mapping the origin (i.e., location) of the person in the conversation with a weather data application. The real value (i.e., crisp value) of the used fuzzy term may be used to identify fuzzy boundaries (e.g., for the category of weather, a boundary of −10° C. to −5° C.).

Boundaries may satisfy a fuzzy term for each different context, since a fuzzy term may be used in more than one context. If a fuzzy term has more than one context, then the same fuzzy term may have more than one boundary. A conversation may be built by boundaries that satisfy the fuzzy term to the boundaries for each different context. For example, a computation system may identify a fuzzy term, then the computation system may retrieve a crisp value based on the identified concept. Context may be defined with attributes for mapping fuzzy terms to the partition that may be relevant to the specific context.

An association may be built and mapped for each fuzzy term. The association may be a kind of context the fuzzy term value may be deduced from and the crisp value that the fuzzy term partition program has collected. Once the fuzzy term partition program builds the association, the more data that is supplied (i.e., more data provided to a corpus or a database) may result in more attributes. A fuzzy term partition program may build the association map to map fuzzy terms with context attributes relevant to a particular fuzzy term category. The category context may have a defined set of attributes used to build partitions. At runtime (i.e., the time the program is executing), the corresponding partitions may be extracted using context attributes. For example, for the category of weather, the context attributes can be defined by region, location, time of day or season. The fuzzy term partition program may produce one partition or more than one partition corresponding to one attribute or more than one attribute (e.g., location and season).

As more data is received and processed, an additional level of granularity to the existent or new attributes may be added. For example, the attribute of region with fuzzy values (i.e., fuzzy terms) mapped to a large region may be extended to smaller, town based, regions as more data is provided. The fuzzy term partition program may use, for example, a statistical method that averages individual usage when collecting data for building a fuzzy partition.

Applying the fuzzy partitions at runtime may include receiving an input and detecting the context of the conversation. Then a corresponding fuzzy partition may be applied to the context for mapping the used fuzzy term to correspond to one or more crisp values. The runtime may include an implementation process that may provide recommendations to a user to describe the intent of the conversation using crisp values. For example, someone from Canada would like to visit a warm place and provides an input into a computing device using the fuzzy term warm. The program may detect that the person asking for a warm destination resides in Canada and a temperature range considered to be warm for a person living in Canada is a crisp value range of A→B. The program may then provide recommend places within an A→B temperature range. The person may use a fuzzy term and the person may receive individualized data applying to warm destinations.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and a fuzzy term partition program 110a. The networked computer environment 100 may also include a server 112 that is enabled to run a fuzzy term partition program 110b that may interact with a database 114 and a communication network 116. The networked computer environment 100 may include a plurality of computers 102 and servers 112, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 4, server computer 112 may include internal components 902a and external components 904a, respectively, and client computer 102 may include internal components 902b and external components 904b, respectively. Server computer 112 may also operate in a cloud computing service model, such as Software as a Service (SaaS), Platform as a Service (PaaS), Analytics as a Service (AaaS) or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the fuzzy term partition program 110a, 110b may interact with a database 114 that may be embedded in various storage devices, such as, but not limited to a computer/mobile device 102, a networked server 112, or a cloud storage service.

According to the present embodiment, a user using a client computer 102 or a server computer 112 may use the fuzzy term partition program 110a, 110b (respectively) to build and apply fuzzy term partitions. The fuzzy term partition method is explained in more detail below with respect to FIGS. 2A, 2B and 3.

Figure 2A:
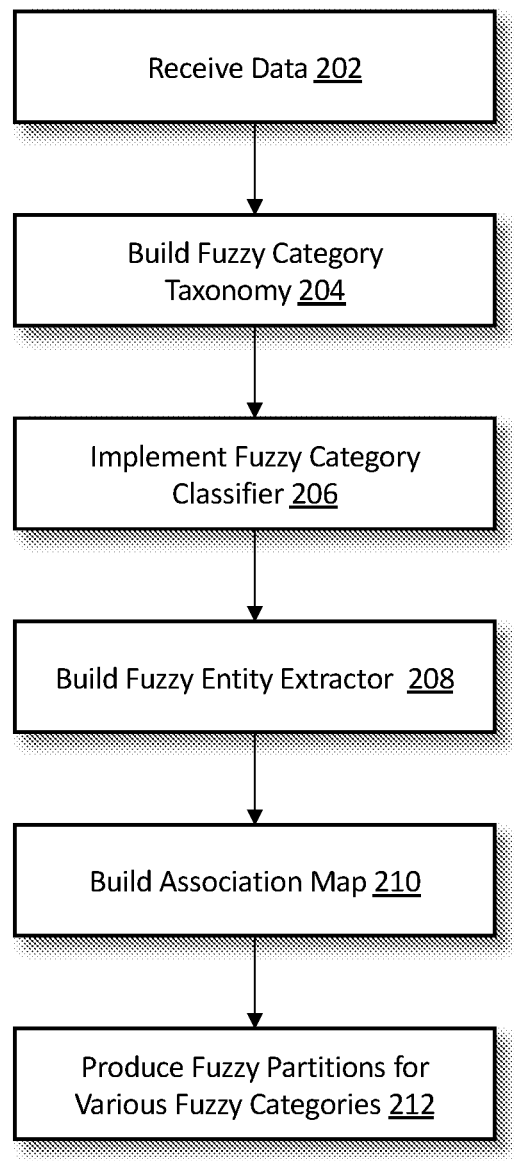
FIGS. 2A and 2B are operational flowcharts illustrating a process for building fuzzy term partitions according to at least one embodiment.
Figure 2B:
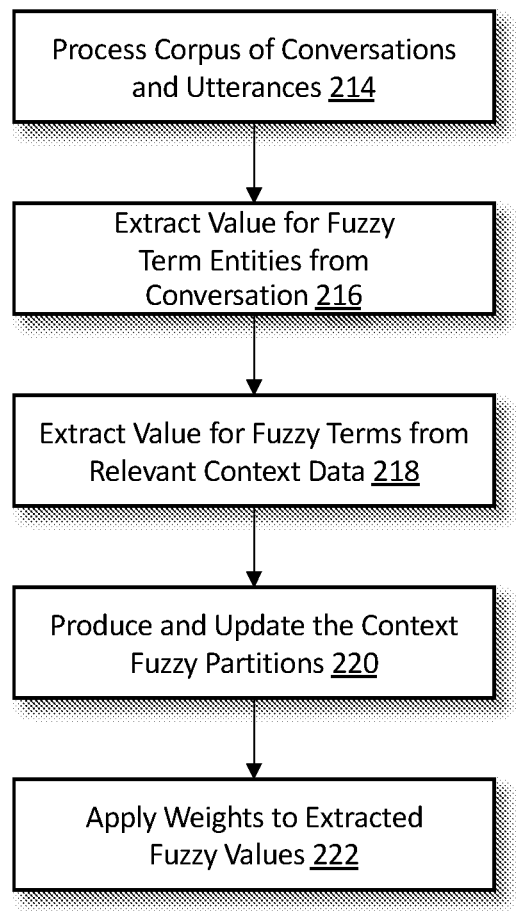

Referring now to FIGS. 2A and 2B, an operational flowchart illustrating the exemplary fuzzy term partition building process 200 used by the fuzzy term partition program 110a, 110b according to at least one embodiment is depicted.

At 202, data is received. Data may be obtained from a corpus or a database (e.g., database 114). Information previously stored on a database and information flowing into a database (i.e., real-time input to a database) may be obtained by the fuzzy term partition program 110a, 110b. Data may include information obtained from various sources, such as social media accounts, Internet of Things (IoT) devices, sensors, audio files (e.g., wav or mp3), video files (e.g., avi, flv or mp4), websites and user profiles. For example, a database may store information relating to the weather and the weather data may be sent via a communication network 116 from an IoT sensor device. The weather data may also have been previously stored on a database and the information may be accessible to the fuzzy term partition program 110a, 110b.

Data may also be received by verbal communication or by type-written communication. Verbal communication may be provided by an individual speaking into a device (e.g., computer 102) or by a device that receives the communication. A conversation or utterance may be captured by various computing devices, for example, a device with a microphone. Some devices may include, for example, a smart phone, a smart watch, a tablet or a computing device (e.g., computer 102), all of which may contain a microphone. Type-written communication may be provided by an individual using a computing device to type a message, for example, a text message, an email message or a social media post.

At 204, a fuzzy category taxonomy is built. A category taxonomy may be built by defining the fuzzy terms and the fuzzy term attributes. The fuzzy term attributes may include associating the fuzzy terms with a category. A category may be defined with attributes mapped to the extracted fuzzy term used in a conversation. For example, the fuzzy terms cold, warm or hot may have an associated attribute of temperature. A category taxonomy may define the category and may also define the fuzzy term people use to describe the category. For each extracted fuzzy term, the fuzzy term partition program 110a, 110b may group the fuzzy terms into a category. For each communication that contains a fuzzy term, building the category taxonomy may include associating a category to each extracted fuzzy term. The extracted fuzzy terms may then be grouped into one category or multiple categories based on the context of the fuzzy term.

A category may contain a fuzzy term dictionary. For example, a product category may contain the fuzzy terms cheap, expensive, reasonable, a good deal, and other phrases extracted from conversations and dictionaries. After a fuzzy term has been categorized, the fuzzy term may hold a different context or a different crisp value associated with the fuzzy term for a particular region. For example, a person may view a particular product price as expensive in one region and a person in a different region may view the same product price as reasonable or cheap.

Next, at 206, the fuzzy category classifier is implemented. The fuzzy category classifier may be trained to detect the phrases that contain fuzzy categories. The fuzzy term partition program 110a, 110b may build and implement a classifier to detect if a fuzzy term has been used in an utterance or a conversation. The category of the utterance or conversation may be identified and the fuzzy term partition program 110a, 110b may compute a higher confidence score for utterances with fuzzy terms. The classifier may be built by training a language model based on labeling particular utterances based on the trained data. A trained language model may include, for example, a set of keywords and the keyword frequencies (i.e., the number of time the keywords are used in an utterance) for a specific category and the category may include a unigram language model. The classifier may be trained to detect utterances of a category. For example, an utterance of the category weather may be detected by the classifier. The classifier may provide results for future outputs the fuzzy term partition program 110a, 110b may use to identify fuzzy terms. Correspondingly, the sentence, conversation or utterance may be labeled by a category.

Then, at 208, the fuzzy entity extractor is built. The fuzzy term partition program 110a, 110b may use the fuzzy term dictionary and the fuzzy term categories to build the entity extractor. The fuzzy term partition program 110a, 110b may build and train the fuzzy extractor to detect and extract fuzzy terms that are relevant to the identified category. The fuzzy term extractor may know (i.e., have access to) the fuzzy term categories from step 204. The fuzzy term partition program 110a, 110b may find related fuzzy terms within a category by using the fuzzy term dictionary to extract the latest fuzzy terms. A fuzzy term entity may include a fuzzy term and the fuzzy term's attributes. The fuzzy entity extractor may extract the fuzzy term and associate the fuzzy term with the fuzzy term attributes available in, for example, the category dictionary (e.g., the fuzzy term cold is associated with the attribute temperature).

For example, a normal daily utterance about the weather may reference a cold day. The term cold day may provide context data for the fuzzy term where the context may be described as regional, demographical or professional. A professional context may, for example, include a scenario when weather may affect a person who works outside. The context to build the entity extractor may depend on the usage or implementation of the fuzzy term partition program 110a, 110b. Weather data may, for example, be important to regional, demographical or professional contexts at a certain time of the day to associate a crisp value to a fuzzy term. The fuzzy term partition program 110a, 110b may identify, for example, the context data for regional weather and may obtain the weather data for the regions from a weather data application. The obtained weather data may provide temperatures for a particular context (e.g., region) at a particular time. The context of region may be obtained from data from the region where the conversation or utterance happened and the weather data may be tracked for a particular time of day and be associated with the stated fuzzy terms.

Another example may include a conversation of a context of two individuals conversing and one states that the temperature outside is 20° C. and the current temperature may be too cold to go swimming or too cold to go to the beach. The fuzzy term partition program 110a, 110b may identify the category weather and extract the fuzzy term cold with an attribute of temperature.

At 210, an association map is built. An association map may associate fuzzy terms with various usage contexts. One fuzzy term may have an association with one or more contexts. Each fuzzy term context may be partitioned and associated with different contexts, such as location, region, culture, demographic, professional, personal preferences, group preferences or age of the individuals. Since contexts may vary from a single fuzzy term, an association map is built to correspond each fuzzy term with the relevant associations.

Then, at 212, the fuzzy partitions for various fuzzy categories are produced. For each fuzzy term, a fuzzy category may be built by a partition. The partition may contain attributes, context and values that are crisp values of mapped fuzzy terms. The value (i.e., crisp value) of the fuzzy term for a particular context may have a particular value between A→B.

For example, a built fuzzy partition may categorize data as shown in Table 1.

TABLE 1

Fuzzy Partition Examples

| | |
|---|---|
| Category → Product | Category → Traffic |
| Fuzzy Term → Cheap, Expensive, Good Deal | Fuzzy Term → Rush-hour, Congested, Traffic Jam, Bumper to Bumper |
| Attribute → Pricing | |
| Context Data → State, City | Attribute → density |
| Crisp Value → $A → $B or {$A, $B} | Context Data → Location, Street |
| | Crisp Value → A → B or {A, B} |
| Category → Weather | Category → Route Description |
| Fuzzy Term → Cold, Warm, Hot | Fuzzy Term → Near, Close, Far |
| Attribute → Temperature | Attribute → feet, miles, meters |
| Context Data → Region, Location | Context Data → Location |
| Crisp Value → A° C. → B° C. or {A° C., B° C.} | Crisp Value → A meters → B meters or {A meters, B meters} |

An example of a single fuzzy term having more than one context may include the fuzzy term cool. Cool may be used to describe a weather category with a regional context and cool may also be described as a product category with a product likability context.

Previous steps from FIG. 2A (i.e., steps 202 through 212) provide one embodiment of implementation steps to build fuzzy partitions. Subsequent steps from FIG. 2B (i.e., steps 214 through 222) provide one embodiment the fuzzy term partition program 110a, 110b may use to produce fuzzy partitions for various fuzzy categories as shown in Table 1.

At 214, the corpus of conversations and utterances are processed. For each fuzzy partition produced at 212, the fuzzy term partition program 110a, 110b may process a corpus (e.g., a database 114) of conversations and utterances. Processing a corpus of conversations using partitions may provide boundaries for each different context and may build more associations as more conversations are processed. The fuzzy term partition program 110a, 110b may apply the fuzzy category classifier to detect the utterances and conversations related to the specific analyzed category. For example, detecting the weather-related utterances.

Next, at 216, the value for fuzzy term entities from conversations are extracted. Fuzzy entities may be generated by the fuzzy entity extractor. The fuzzy entity extractor may extract a fuzzy term and associate the fuzzy term with attributes available in, for example, the category dictionary (e.g., the fuzzy term cold is associated with the attribute temperature). Fuzzy terms are identified in a conversation as words that may, for example, be subjective.

At 218, the value for fuzzy terms from relevant context data is extracted. The relevant context value may be extracted by establishing the source of the conversation, such as the location where the person making the comment or utterance lives. Location may be retrieved, for example, by acquiring data on a social media profile or by acquiring coordinate data from a global positioning system (GPS). Fuzzy term values may be a numeric value associated with, for example, the temperature of the region the utterance was made.

Next, at 220, the context fuzzy partitions are produced and updated. For each conversation or message, the fuzzy term partition program 110a, 110b may produce the context of a fuzzy partition or may update the context of a fuzzy partition. The fuzzy term partition program 110a, 110b may continuously be adding to or updating the fuzzy partitions as more data is received and processed. Data may be received as input data at step 202 and data may also be processed using stored data on a corpus (e.g., a database 114). Data may also be received and processed in real-time, for example, from sensors, microphones, computing devices, smart phones, smart watches, tablets or IoT devices. Other data sources may include, for example, websites or a user's profile data. As data is received and processed, the fuzzy partitions may be updated with the latest extracted values.

Then, at 222, weights to the extracted fuzzy values are applied. Different weights may be applied to the extracted fuzzy values based on the person's expertise level relevant to the referenced fuzzy term. For example, if individual A is conversing about the weather in a region individual A has resided for a long duration of time, determined by checking a public records database, individual A's assigned weight may be higher than individual B, when individual B has resided in the same region for less time than individual A.

Figure 3:
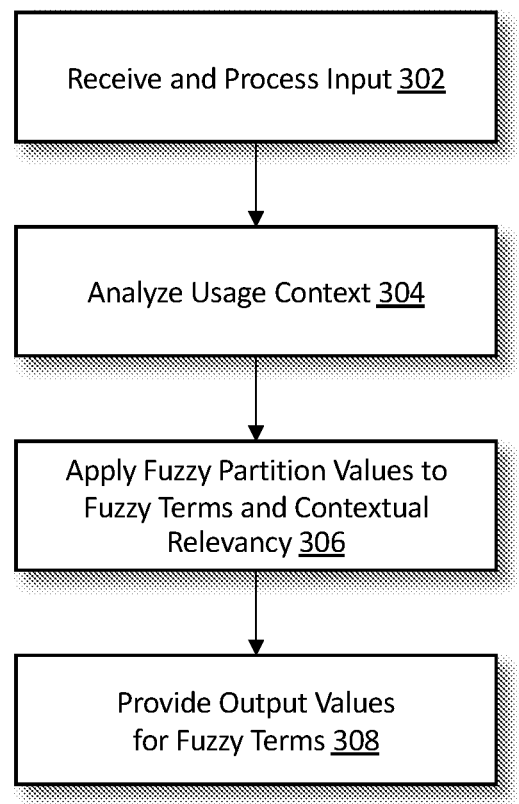
FIG. 3 is an operational flowchart illustrating a process for applying fuzzy term partitions according to at least one embodiment.

Referring now to FIG. 3, an operational flowchart illustrating the exemplary fuzzy term partition application process 300 used by the fuzzy term partition program 110a, 110b according to at least one embodiment is depicted.

At 302, an input is received and processed. Data may be received by verbal communication or by type-written communication. Verbal communication may be provided by an individual speaking into a device or by a device that receives the communication. A conversation or utterance may be captured by various computing devices, for example, a device with a microphone. Some devices may include, for example, a smart phone, a smart watch, a tablet or a computing device (e.g., computer 102), all of which may contain a microphone. Type-written communication may be provided by an individual using a computing device to type a message, for example, a text message, an email message or a social media post. NLP may be used to process the received input.

Next, at 304, the usage context is analyzed. The usage context may be retrieved from, for example, the location of the person who is communicating with fuzzy terms. The context may be analyzed using previously created dictionaries, categories or classifiers processed and built by the fuzzy term partition program 110a, 110b.

Then, at 306, fuzzy partition values to fuzzy terms and contextual relevancy are applied. Contextual relevancy may associate the stated fuzzy term with, for example, a particular region or demographic. Contextual relevancy may be obtained from the previously built partitions at step 212. Associating the fuzzy term with the proper context using built partitions may provide relevant data, such as attributes or crisp data.

At 308, output values for fuzzy terms are provided. An output may be provided on a computing device (e.g., computer 102) to a user. An output may, for example, be a voice alert or a type-written message in the form of a text message or an email message. The output may provide the user with, for example, an answer to a question about finding warm vacation locations during the winter.

It may be appreciated that FIGS. 2A, 2B and 3 provide only an illustration of one embodiment and do not imply any limitations with regard to how different embodiments may be implemented. Many modifications to the depicted embodiment(s) may be made based on design and implementation requirements.

Figure 4:
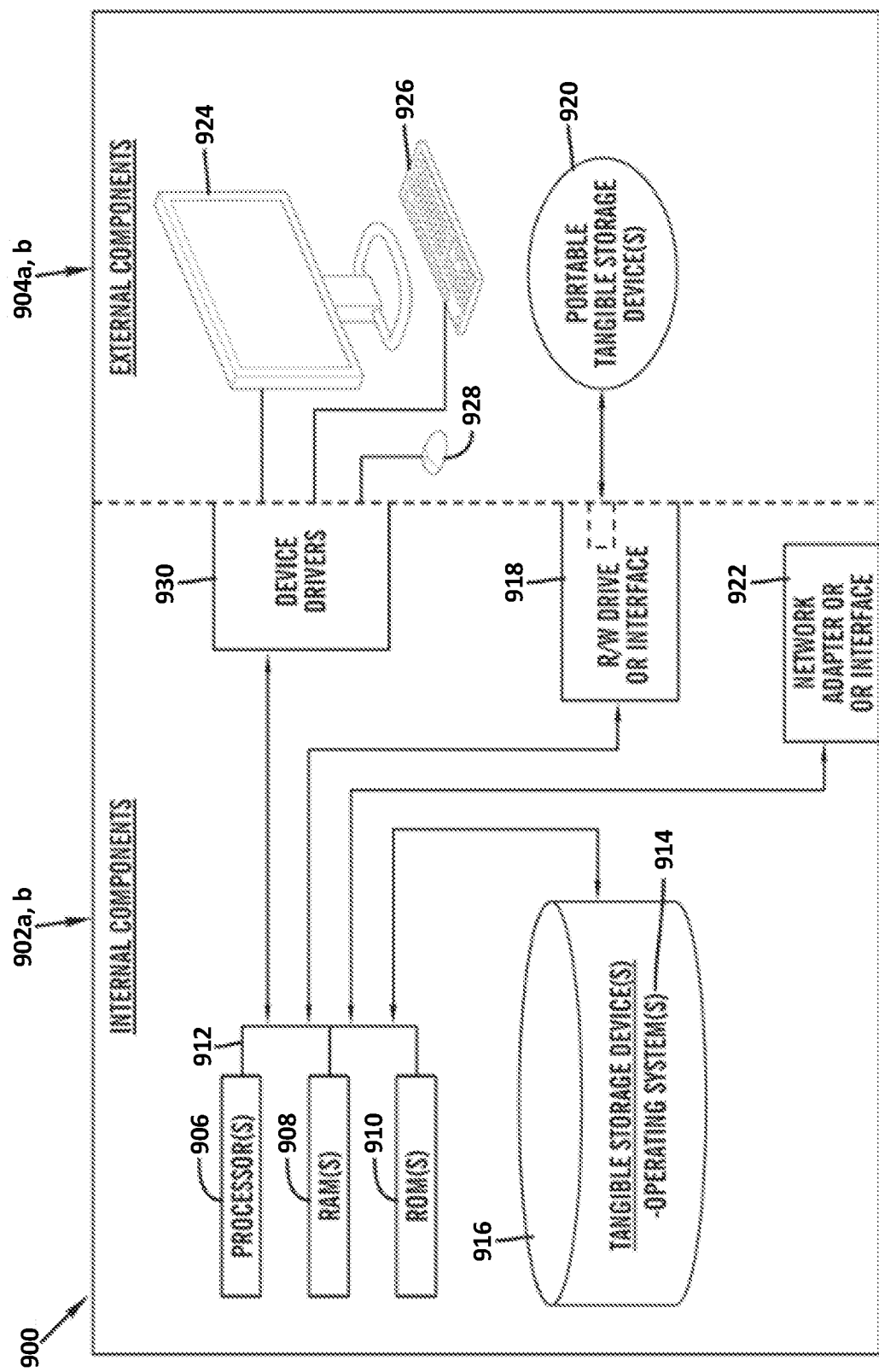
FIG. 4 is a block diagram of internal and external components of computers and servers depicted in FIG. 1 according to at least one embodiment.

FIG. 4 is a block diagram 900 of internal and external components of computers depicted in FIG. 1 in accordance with an illustrative embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may be represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902a, b and external components 904a, b illustrated in FIG. 4. Each of the sets of internal components 902a, b includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914, the software program 108 and the fuzzy term partition program 110a in client computer 102, and the fuzzy term partition program 110b in network server 112, may be stored on one or more computer-readable tangible storage devices 916 for execution by one or more processors 906 via one or more RAMs 908 (which typically include cache memory). In the embodiment illustrated in FIG. 4, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902a, b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the fuzzy term partition program 110a, 110b can be stored on one or more of the respective portable computer-readable tangible storage devices 920, read via the respective R/W drive or interface 918 and loaded into the respective hard drive 916.

Each set of internal components 902a, b may also include network adapters (or switch port cards) or interfaces 922 such as a TCP/IP adapter cards, wireless wi-fi interface cards, or 3G or 4G wireless interface cards or other wired or wireless communication links. The software program 108 and the fuzzy term partition program 110a in client computer 102 and the fuzzy term partition program 110b in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the fuzzy term partition program 110a in client computer 102 and the fuzzy term partition program 110b in network server computer 112 are loaded into the respective hard drive 916. The network may comprise copper wires, optical fibers, wireless transmission, routers, firewalls, switches, gateway computers and/or edge servers.

Each of the sets of external components 904a, b can include a computer display monitor 924, a keyboard 926, and a computer mouse 928. External components 904a, b can also include touch screens, virtual keyboards, touch pads, pointing devices, and other human interface devices. Each of the sets of internal components 902a, b also includes device drivers 930 to interface to computer display monitor 924, keyboard 926, and computer mouse 928. The device drivers 930, R/W drive or interface 918 and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Analytics as a Service (AaaS): the capability provided to the consumer is to use web-based or cloud-based networks (i.e., infrastructure) to access an analytics platform. Analytics platforms may include access to analytics software resources or may include access to relevant databases, corpora, servers, operating systems or storage. The consumer does not manage or control the underlying web-based or cloud-based infrastructure including databases, corpora, servers, operating systems or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
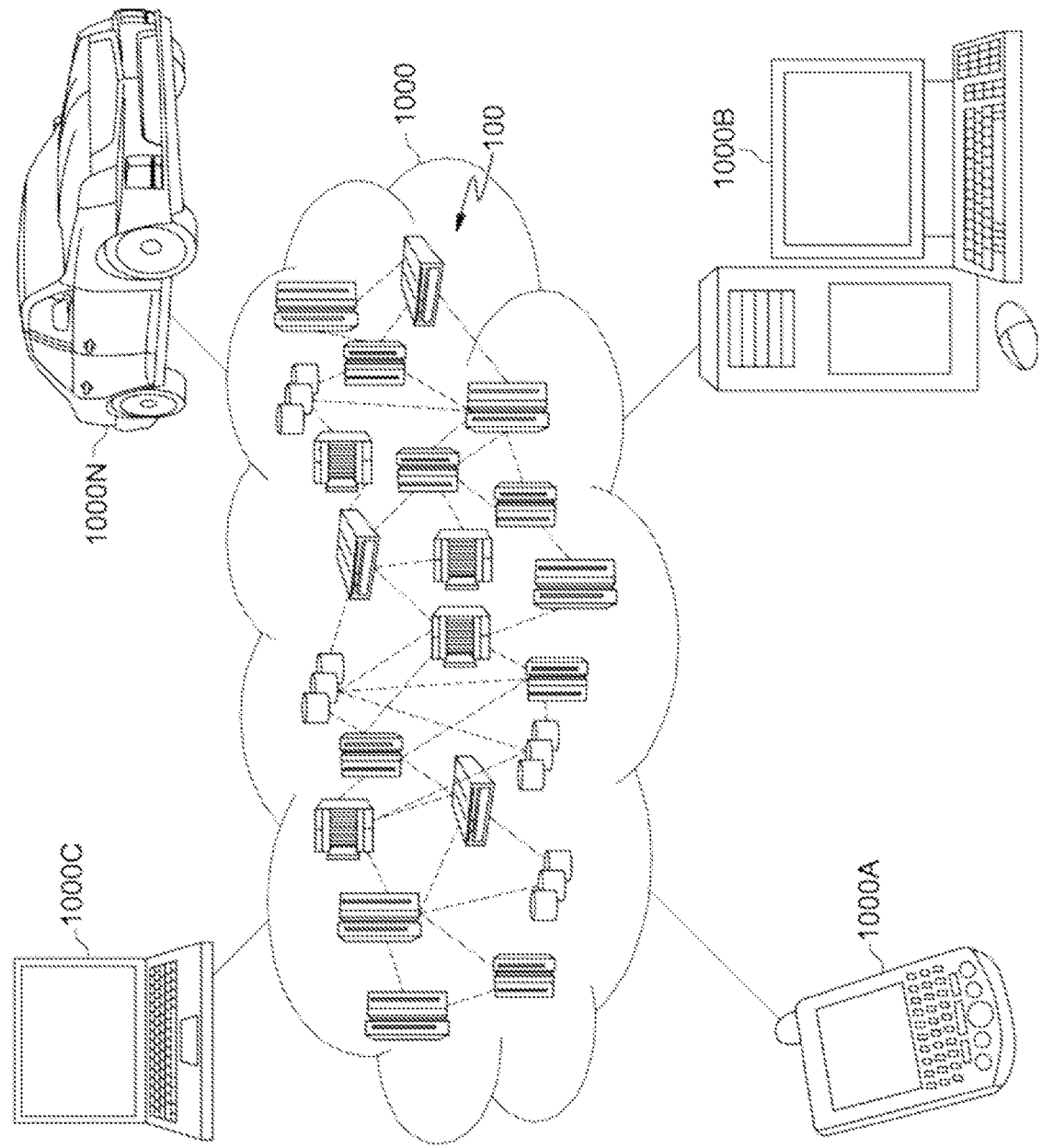
FIG. 5 is a block diagram of an illustrative cloud computing environment including the computer system depicted in FIG. 1, in accordance with an embodiment of the present disclosure.

Referring now to FIG. 5, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 5 are intended to be illustrative only and that computing nodes 100 and cloud computing environment 1000 can communicate with any type of computerized device over any type of network and/or network addressable connection (e.g., using a web browser).

Figure 6:
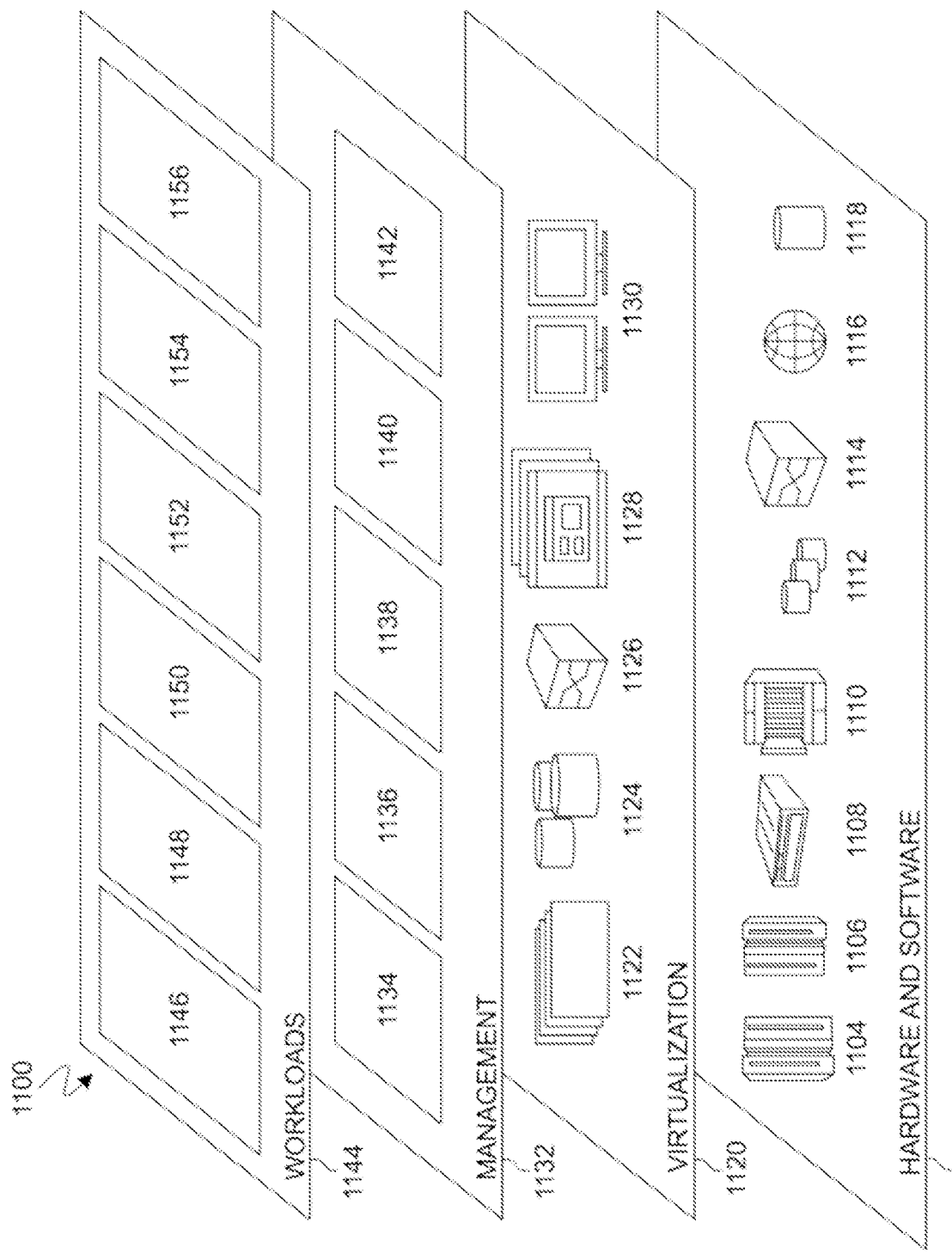
FIG. 6 is a block diagram of functional layers of the illustrative cloud computing environment of FIG. 5, in accordance with an embodiment of the present disclosure.

Referring now to FIG. 6, a set of functional abstraction layers 1100 provided by cloud computing environment 1000 is shown. It should be understood in advance that the components, layers, and functions shown in FIG. 6 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and fuzzy partition implementation and application 1156. A fuzzy term partition program 110a, 110b provides a way to build and apply fuzzy term partitions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for building and applying fuzzy term partitions, the method comprising:
   building a fuzzy category taxonomy;
   building a fuzzy term extractor based on the built fuzzy category taxonomy;
   associating a fuzzy term with a plurality of context data;
   producing a context data partition for the associated fuzzy term based on the associated plurality of context data; and
   applying a weight to the fuzzy term.

2. The method of claim 1, further comprising:
   receiving a fuzzy term input;
   analyzing a usage context for the received fuzzy term input;
   applying a fuzzy partition value to the received fuzzy term input;
   applying a contextual relevancy to the received fuzzy term input; and
   providing an output based on the applied contextual relevancy.

3. The method of claim 1, wherein the weight applied to the fuzzy term is based on a level of expertise of a person speaking the fuzzy term or the person typing the fuzzy term.

4. The method of claim 1, wherein the context data partition is created for each fuzzy term.

5. The method of claim 4, wherein each fuzzy term has a plurality of context data partitions created for the fuzzy term and associated with the fuzzy term.

6. The method of claim 4, wherein the context data partition contains a set of data, and wherein the set of data is partitioned as a category, the fuzzy term, an attribute, a plurality of context data, and a crisp value.

7. The method of claim 6, wherein the crisp value is a specific value or a specific range of values that depict the fuzzy term.

8. A computer system for building and applying fuzzy term partitions, comprising:
   one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:

building a fuzzy category taxonomy;

building a fuzzy term extractor based on the built fuzzy category taxonomy;

associating a fuzzy term with a plurality of context data;

producing a context data partition for the associated fuzzy term based on the associated plurality of context data; and applying a weight to the fuzzy term.

9. The computer system of claim 8, further comprising:

receiving a fuzzy term input;

analyzing a usage context for the received fuzzy term input;

applying a fuzzy partition value to the received fuzzy term input;

applying a contextual relevancy to the received fuzzy term input; and providing an output based on the applied contextual relevancy.

10. The computer system of claim 8, wherein the weight applied to the fuzzy term is based on a level of expertise of a person speaking the fuzzy term or the person typing the fuzzy term.

11. The computer system of claim 8, wherein the context data partition is created for each fuzzy term.

12. The computer system of claim 11, wherein each fuzzy term has a plurality of context data partitions created for the fuzzy term and associated with the fuzzy term.

13. The computer system of claim 11, wherein the context data partition contains a set of data, and wherein the set of data is partitioned as a category, the fuzzy term, an attribute, a plurality of context data, and a crisp value.

14. The computer system of claim 13, wherein the crisp value is a specific value or a specific range of values that depict the fuzzy term.

15. A computer program product for building and applying fuzzy term partitions, comprising:

one or more computer-readable storage media and program instructions stored on at least one of the one or more tangible storage media, the program instructions executable by a processor to cause the processor to perform a method comprising:

building a fuzzy category taxonomy;

building a fuzzy term extractor based on the built fuzzy category taxonomy;

associating a fuzzy term with a plurality of context data;

producing a context data partition for the associated fuzzy term based on the associated plurality of context data; and applying a weight to the fuzzy term.

16. The computer program product of claim 15, further comprising:

receiving a fuzzy term input;

analyzing a usage context for the received fuzzy term input;

applying a fuzzy partition value to the received fuzzy term input;

applying a contextual relevancy to the received fuzzy term input; and providing an output based on the applied contextual relevancy.

17. The computer program product of claim 15, wherein the weight applied to the fuzzy term is based on a level of expertise of a person speaking the fuzzy term or the person typing the fuzzy term.

18. The computer program product of claim 15, wherein the context data partition is created for each fuzzy term.

19. The computer program product of claim 18, wherein each fuzzy term has a plurality of context data partitions created for the fuzzy term and associated with the fuzzy term.

20. The computer program product of claim 18, wherein the context data partition contains a set of data, and wherein the set of data is partitioned as a category, the fuzzy term, an attribute, a plurality of context data, and a crisp value.

* * * * *